US008331712B2

United States Patent
Sung et al.

(10) Patent No.: US 8,331,712 B2
(45) Date of Patent: Dec. 11, 2012

(54) METHOD FOR DESIGNING COMPUTATIONAL OPTICAL IMAGING SYSTEM

(75) Inventors: Hsin-Yueh Sung, Taipei County (TW); Chir-Weei Chang, Taoyuan County (TW)

(73) Assignee: Industrial Technology Research Institute, Hsin-Chu (TW)

( * ) Notice: Subject to any disclaimer, the term of this patent is extended or adjusted under 35 U.S.C. 154(b) by 757 days.

(21) Appl. No.: 12/491,557

(22) Filed: Jun. 25, 2009

(65) Prior Publication Data

US 2009/0324101 A1    Dec. 31, 2009

Related U.S. Application Data

(60) Provisional application No. 61/075,470, filed on Jun. 25, 2008.

(30) Foreign Application Priority Data

Jul. 25, 2008    (TW) ............................... 97128452 A

(51) Int. Cl.
G06K 9/40    (2006.01)
(52) U.S. Cl. ...................................... 382/254
(58) Field of Classification Search .................. 382/254, 382/264, 276, 278, 312, 321; 396/89, 111, 396/125, 128; 703/2, 4, 6, 13; 359/558, 359/563, 637
See application file for complete search history.

(56) References Cited

U.S. PATENT DOCUMENTS

| | | | | |
|---|---|---|---|---|
| 6,567,570 B1* | 5/2003 | Steinle et al. | ................. | 382/312 |
| 7,616,842 B2* | 11/2009 | Robinson | ..................... | 382/312 |
| 2003/0053036 A1* | 3/2003 | Fujishima et al. | ............... | 355/53 |
| 2005/0073647 A1* | 4/2005 | Mihashi et al. | ................ | 351/200 |
| 2005/0088745 A1* | 4/2005 | Cathey et al. | ................. | 359/568 |
| 2005/0197809 A1* | 9/2005 | Dowski et al. | ..................... | 703/6 |
| 2006/0098237 A1* | 5/2006 | Steinberg et al. | ............. | 358/302 |
| 2006/0256226 A1* | 11/2006 | Alon et al. | ..................... | 348/335 |
| 2007/0239417 A1 | 10/2007 | Alon et al. | | |
| 2008/0198331 A1* | 8/2008 | Azar et al. | .................... | 351/209 |
| 2008/0234984 A1* | 9/2008 | Ortyn et al. | ................... | 702/190 |
| 2009/0096915 A1* | 4/2009 | Kelly et al. | .................... | 348/360 |
| 2010/0002955 A1* | 1/2010 | George et al. | ................ | 382/280 |

FOREIGN PATENT DOCUMENTS

CN    1898590 A    1/2007

OTHER PUBLICATIONS

State Intellectual Property Office of the People'S Republic of China, "Office Action", Mar. 31, 2012, China.

* cited by examiner

*Primary Examiner* — Chan S Park
*Assistant Examiner* — Shervin Nakhjavan
(74) *Attorney, Agent, or Firm* — WPAT PC; Justin King

(57) ABSTRACT

A method for designing computational optical imaging system, including a step for setting a target; a step for designing an optical module; and a step for designing an image restoration module; wherein by using the similarity and blur minimization of the optical module and the image restoration module to gather the optimization judgment standard, the step for designing an optical module and the step for designing an image restoration module operate individually synchronously or in sequence, and by a software product to design an optical imaging system so as to reduce the quantity and time of calculation and save repairing costs.

21 Claims, 17 Drawing Sheets

| Lens :No Name | | Zoom 1 of 1 | | Ef1 100.029432 | |
|---|---|---|---|---|---|
| Ent beam radius 6.250000 | | Field angle 5.7296e-05 | | Primary wavln 0.587560 | |

| SRF | RADIUS | THICKNESS | APERTURE RADIUS | | GLASS | SPECIAL |
|---|---|---|---|---|---|---|
| OBJ | 0.000000 | 1.0000e+20 | 1.0000e+14 | | AIR | |
| AST | 0.000000 | 0.200000 | 12.500000 | A | BK7 C | A |
| 2 | 0.000000 | 0.000000 | 12.500000 | | AIR | |
| 3 | 61.470000 | 6.000000 | 12.500000 | | BK7 C | |
| 4 | -44.640000 | 2.500000 | 12.500000 | | SF5 C | |
| 5 | -129.940000 | 95.924978 | 12.500000 | | AIR | |
| IMS | 0.000000 | 0.000000 | 5.000000 | | | F |

FIG 12

METHOD FOR DESIGNING COMPUTATIONAL OPTICAL IMAGING SYSTEM

TECHNICAL FIELD

The present invention relates to a technical field of a method for designing a computational optical imaging system, and more particularly to a method for individually designing and modularizing an optical module and an image restoration module.

RELATED ART

The conventional design of hybrid computational optical imaging system is shown as FIG. 1. FIG. 1 shows a diagram of design method of the conventional design of hybrid computational optical imaging system. The method designs a pre-optical module 1A and a post image restoration module 1B in sequence, which is the pre-optical module 1A generates a point spread function (PSF) P first, and then the post image restoration module 1B outputs an image matrix 1B to designing according to the point spread function P. If it doesn't achieve the designer's target and needs to be optimized, return to the pre-optical module to operate and loop it.

The design of the post image restoration module must base on the result of the design of pre-optical module, which is if designer wants to design the post image restoration module, he/she must finish the design of the pre-optical module first to compare.

In United States patent 2005/0197809A1, Edward introduced a system and method for optimizing optical and digital system designs, shown as FIG. 1. The rule for judging how the design of computational optical imaging system is evaluated by the mean square error (MSE) of the reference image and restoration image.

In United States Patent 2007/0239417 A1, Alex introduced a method for designing a camera, which includes objective optics for forming an image on an electronic image sensor and a digital filter for filtering an output of the image sensor. The method includes defining a design of the objective optics and determining coefficients of the digital filter. An input image is processed responsively to the design of the objective optics and the coefficients of the digital filter so as to generate an output image that simulates operation of the camera. The output image is displayed for evaluation by a designer of the camera. The design constraints on the actual objective optics are relaxed by the use of a virtual lens, as though the optical designer had an additional optical element to incorporate in the design for purposes of aberration correction. The method is used a virtual lens to perform the design of computational optical imaging system.

The conventional method and system of the hybrid optical imaging cannot quickly and individually design the pre-optical module and evaluate how it is, and the design of the post-image restoration module must be based on how the pre-optical module is and cannot be modularized individually.

Therefore, there is surely a need for further improving the above method of the hybrid optical imaging.

SUMMARY

According to one embodiment, a method for designing computational optical imaging, which is comprising: setting a target; designing an optical module; and designing an image restoration module; wherein designing an optical module and designing an image restoration module operate individually synchronously or in sequence.

According to another one embodiment, a combination method of a computational optical imaging system is provided, the system having modules of optics and modules of image restoration, the combination method is comprising: selecting one of the modules of optics and acquiring at least one point spread function of the selected optical module; selecting one of the modules of image restoration and acquiring at least one restorable point spread function of the selected image restoration module; and analyzing the similarity of the point spread function of the selected optical module and the selected image restoration module individually or in sequence, and then combining the selected optical module and the selected image restoration module to the system of computational optical imaging when the similarity is equal to or larger than a predetermined threshold value.

According to another one embodiment, a software product comprising instructions stored on computer-readable media, wherein the instructions, when executed by a computer, performs steps for designing the computational optical imaging system, the instructions comprising: instruction for modeling an optical and restoration system including variables definition; instruction for evaluating a merit function from optics and restoration performance including PSF similarity; and instruction for modifying the variables of the optical and restoration system through optimizing and looping it.

Therefore, by using above mentioned method, it can be achieved to modularize the system of computational optical imaging, which is to divide to an optical module and an image restoration module, and gather an objective standard by comparing the similarity and the blur minimization of the point spread functions. The optical module and/or the image restoration module are able to optimize individually so that reducing the calculation time, and are changeable while the optical characteristics of the optical module and/or the image restoration module are almost the same so as not to change whole system but save the repairing costs.

In order to make the foregoing and other objectives, features, and advantages of the present invention comprehensible, an embodiment is described in detail below with reference to the accompanying drawings.

Definitely, the present invention allows some variations on certain parts or arrangement of the parts, but the embodiment selected in the present invention is illustrated in detail in the specification, and the construction thereof is shown in the accompanying drawings.

BRIEF DESCRIPTION OF THE DRAWINGS

The present invention will become more fully understood from the detailed description given herein below for illustration only, and thus are not limitative of the present invention, and wherein:

FIG. 12 is the parameter list of the present invention simulated by Doublet;

DETAILED DESCRIPTION

Figure 1:
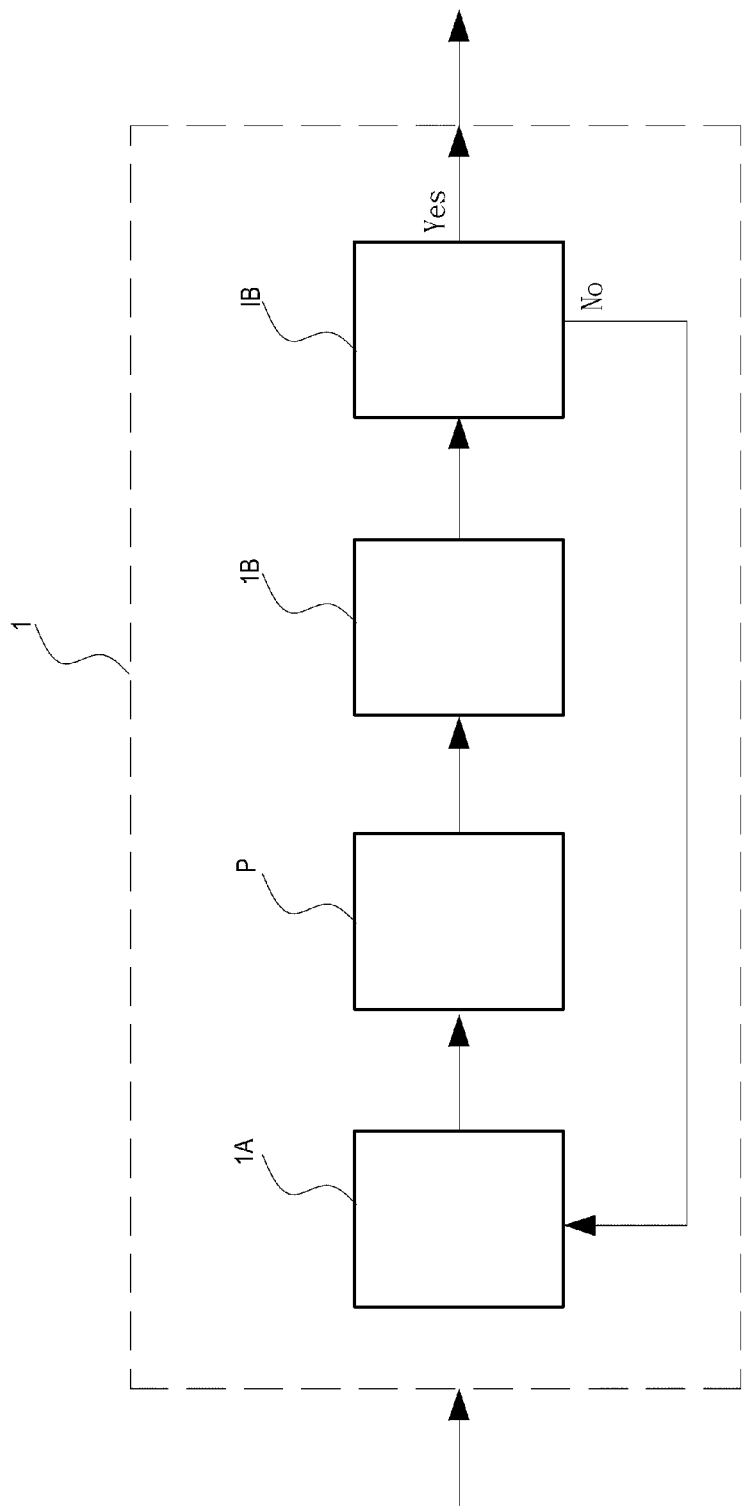
FIG. 1 shows a diagram of design method of the conventional design of computational optical imaging system.
Figure 2:
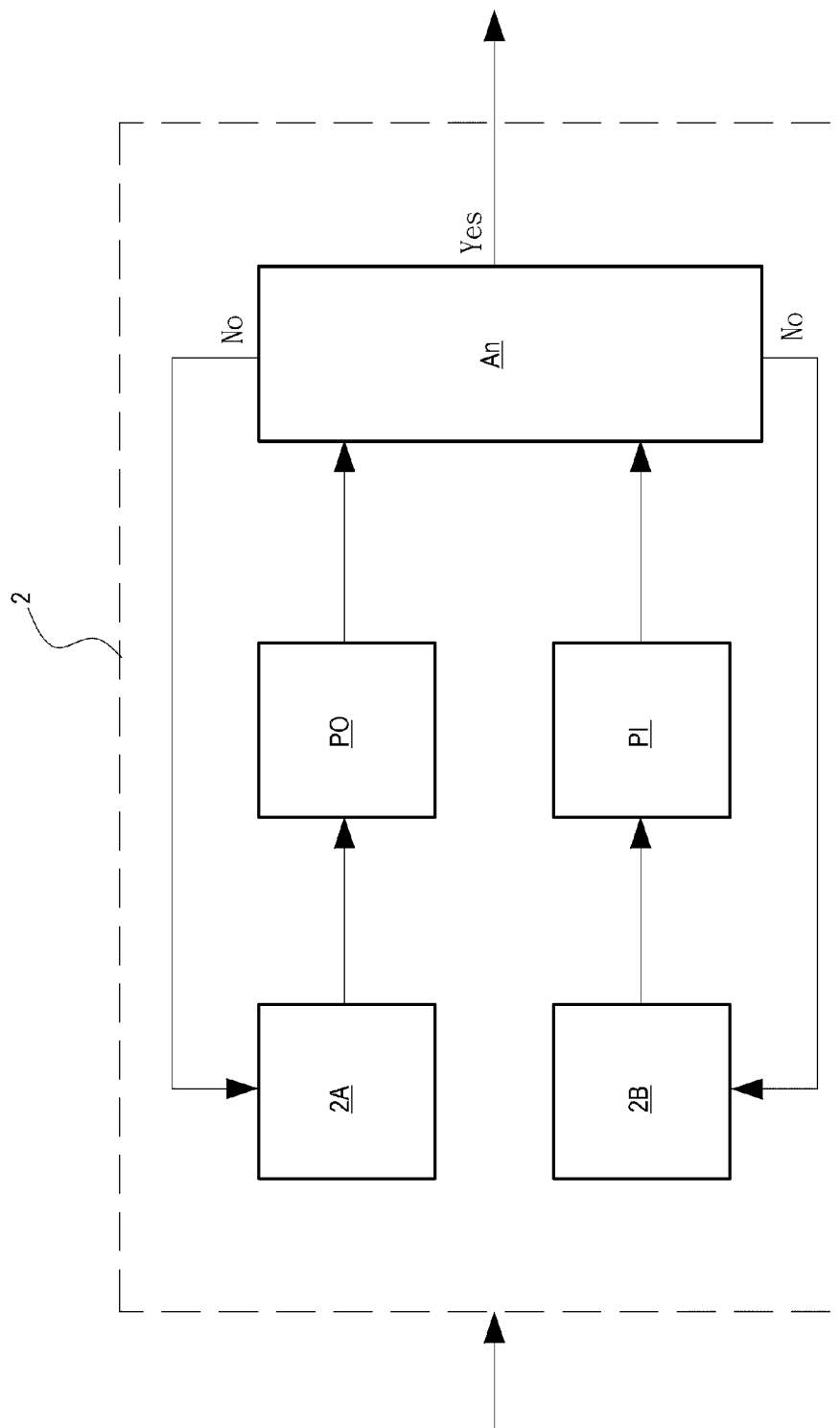
FIG. 2 shows a system diagram for designing computational optical imaging of the present invention.

FIG. 2 is a system diagram for designing computational optical imaging system. The system for designing computational optical imaging 2 comprises of an optical module 2A (ex. lens construction) and an image restoration module 2B (ex. restoration filter), wherein the optical module 2A and image restoration module 2B operate individually synchronously or in sequence.

The optical module 2A is able to generate a point spread function (PSF) of optics PO and the image restoration module 2B is able to output a restorable point spread function of image restoration PI, and then it can be individually designed the optical module 2A and the image restoration module 2B by comparing the similarity of point spread function or optical transfer function (OTF). From the point of view of Mathematics, the optical transfer function is the Fourier Transform of point spread function. Therefore, the optical transfer function is as same as the point spread function. The method for comparing the similarity of point spread function by an analyzer An is comprising of Fidelity, Correlation, and Hilbert Space Projected Angle, which the equations are shown as below.

Fidelity:

$$F = 1 - \frac{\int_{-\infty}^{\infty}\int_{-\infty}^{\infty}((PSF2(x,y) - PSF1(x,y))^2 dxdy}{\int_{-\infty}^{\infty}\int_{-\infty}^{\infty}(PSF1(x,y))^2 dxdy}$$

Correlation:

$$C = \frac{\int_{-\infty}^{\infty}\int_{-\infty}^{\infty} PSF1(x,y)PSF2(x,y) dxdy}{\int_{-\infty}^{\infty}\int_{-\infty}^{\infty}(PSF1(x,y))^2 dxdy}$$

Hilbert Space Projected Angle:

$$H = \frac{\int_{-\infty}^{\infty}\int_{-\infty}^{\infty} PSF1(x,y)PSF2(x,y) dxdy}{\sqrt{\int_{-\infty}^{\infty}\int_{-\infty}^{\infty}(PSF1(x,y))^2 dxdy}\sqrt{\int_{-\infty}^{\infty}\int_{-\infty}^{\infty}(PSF2(x,y))^2 dxdy}}$$

Wherein the PSF1 is the current point spread function generating or outputting from optical module 2A or image restoration module 2B, the PSF2 is the next point spread function generating or outputting from optical module 2A or image restoration module 2B.

First Embodiment

Figure 3:
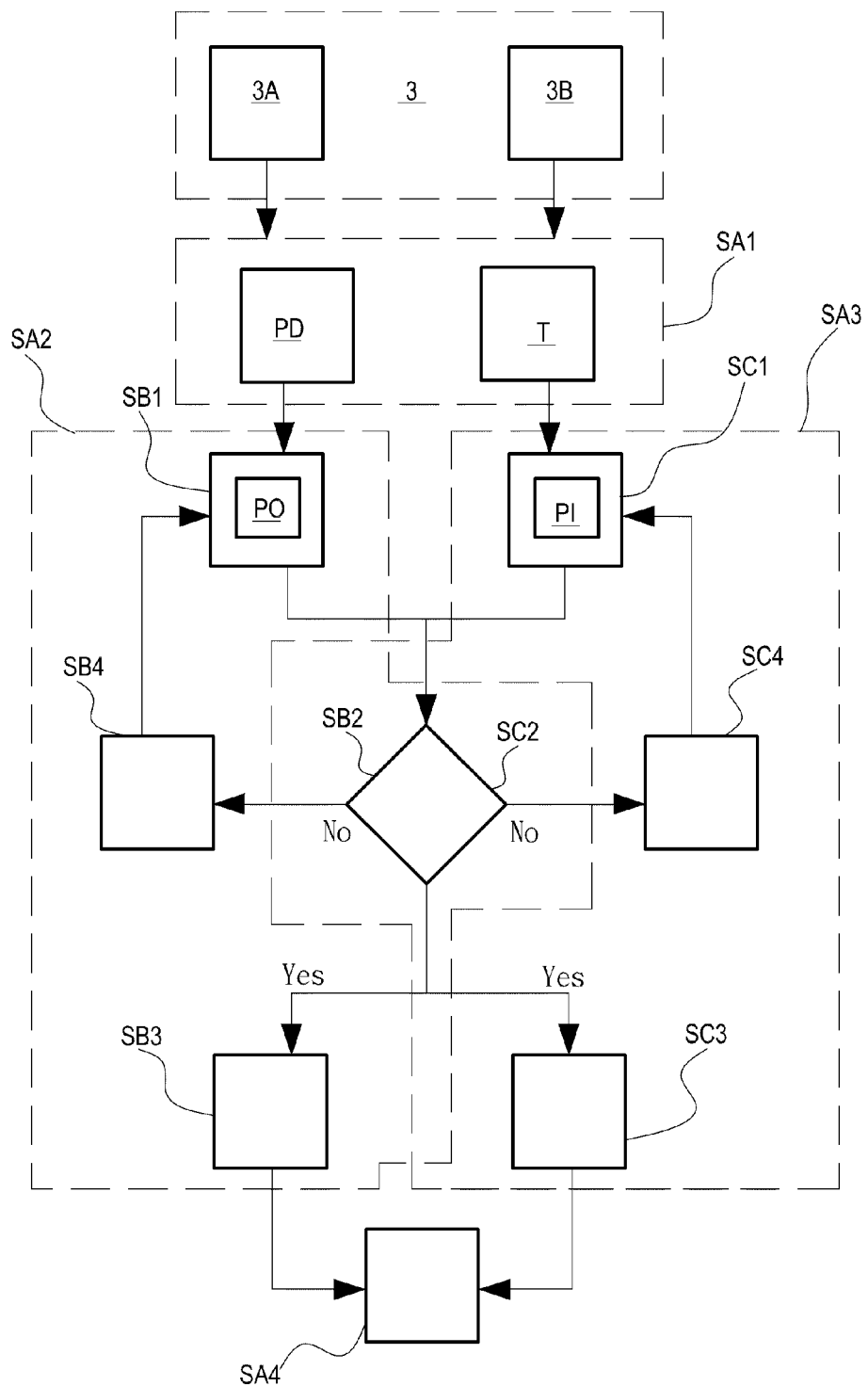
FIG. 3 is a diagram illustrating a first exemplary embodiment of the present invention.

FIG. 3 is a diagram illustrating a first exemplary embodiment of the present invention. The system for designing computational optical imaging 3 comprises of an optical module 3A and an image restoration module 3B, wherein the optical module 3A and image restoration module 3B operate individually synchronously. The method for designing computational optical imaging comprises:

Step SA2: designing an optical module 3A; and
Step SA3: designing an image restoration module 3B.

Before designing an optical module and designing an image restoration module, a target is able to be set (step SA1) and the step for setting the target further comprises of providing a predetermined point spread function and a threshold value.

The step for designing an optical module (step SA2) further comprises:

Step SB1: generating a point spread function of optics PO from the optical module 3A;

Step SB2: comparing the similarity of the point spread function of optics PO and the predetermined point spread function PD;

Step SB3: outputting at least one parameter of the optical module 3A while the similarity of the point spread function of optics PO and the predetermined point spread function PD is equal to or larger than the threshold value T; and Step SB4: optimizing the optical module and looping the step for generating a point spread function of optics PO from the optical module 3A (step SB1) while the similarity of the point spread function of optics PO and the predetermined point spread function PD is less than the threshold value T.

The step for designing an image restoration module (step SA3) further comprises:

Step SC1: generating a restorable point spread function of image restoration PI from the digital image restoration module 3B;

Step SC2: comparing the similarity of the restorable point spread function of image restoration PI and the predetermined point spread function PD;

Step SC3: outputting at least one parameter of the digital image restoration module 3B while the similarity of the restorable point spread function of image restoration PI and the predetermined point spread function PD is equal to or larger than the threshold value T; and Step SC4: optimizing the digital image restoration module 3B and looping the step for generating a restorable point spread function of image restoration PI from the digital image restoration module 3B (step SC1) while the similarity of the restorable point spread function of image restoration PI and the predetermined point spread function PD is less than the threshold value T.

Besides comparing the similarity, the step for comparing the similarity of the point spread function of optics PO and the predetermined point spread function PD (step SB2) further comprises of judging the blur minimization of the point spread function of optics MIO, and the step for comparing the similarity of the point spread function of image restoration PI and the predetermined point spread function PD (step SC2) further comprises of judging the blur minimization of the point spread function of image restoration MID. In general, blur minimization can describe PSF spot size, Strehl ratio, or MTF area, etc. The smaller the PSF is and the lower the blur minimization is.

Furthermore, in the step for outputting at least one parameter of the optical module 3A while the similarity of the point spread function of optics PO and the predetermined point spread function PD is equal to or larger than the threshold value T (step SB3), the at least one parameter of the optical module 3A is including one of or a mixture of a refractive index, a curvature, a thickness and a aspheric coefficient. And in the step for outputting at least one parameter of the digital image restoration module 3B while the similarity of the restorable point spread function of image restoration PI and the predetermined point spread function PD is equal to or larger than the threshold value T (step SC3), the at least parameter of the digital image restoration module 3B is one of the mixture of an adjusting value, a regulation parameter and a signal to noise parameter.

After finishing the step for designing an optical module 3A (step SA2) and the step for designing an image restoration module 3B (step SA3) individually, the method further comprises of outputting an optical image and a restoration image (step SA4).

Second Embodiment

Figure 4:
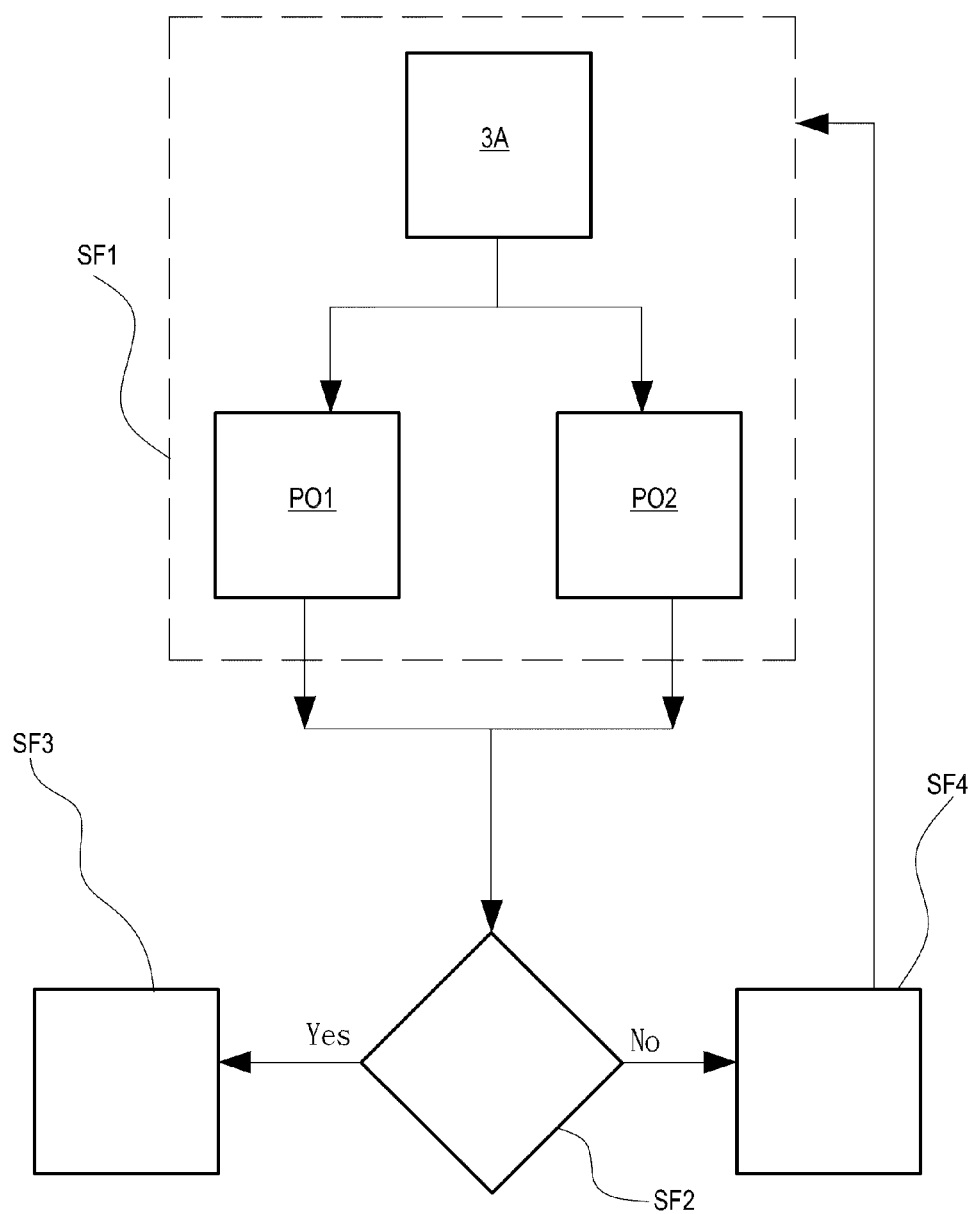
FIG. 4 is a diagram illustrating a second exemplary embodiment of the present invention.

FIG. 4 is a diagram illustrating a second embodiment. The optical module 3A operates individually and optimize alone. The method comprises:

Step SF1: generating at least two point spread functions of optics PO1, PO2 from an optical module 3A;

Step SF2: comparing the similarity of the point spread functions of optics PO1, PO2;

Step SF3: outputting at least one parameter of the optical module 3A when the similarity of point spread functions of optics PO1, PO2 is equal to or larger than the threshold value T; and Step SF4: optimizing the optical module 3A and looping the step for generating at least two point spread functions of optics PO1, PO2 from an optical module 3A (step SF1) when the similarity of point spread functions of optics PO1, PO2 is less than the threshold value T.

In the step for generating at least two point spread functions of optics PO1, PO2 from an optical module 3A (step SF1), it can generate different point spread function of optics (ex. PO1,PO2) by using different object distances or positions.

Furthermore, the step for comparing the similarity of the point spread functions of optical module PO1, PO2 (step SF2) further comprises of judging the blur minimization of the point spread function of optical module.

Third Embodiment

Figure 5:
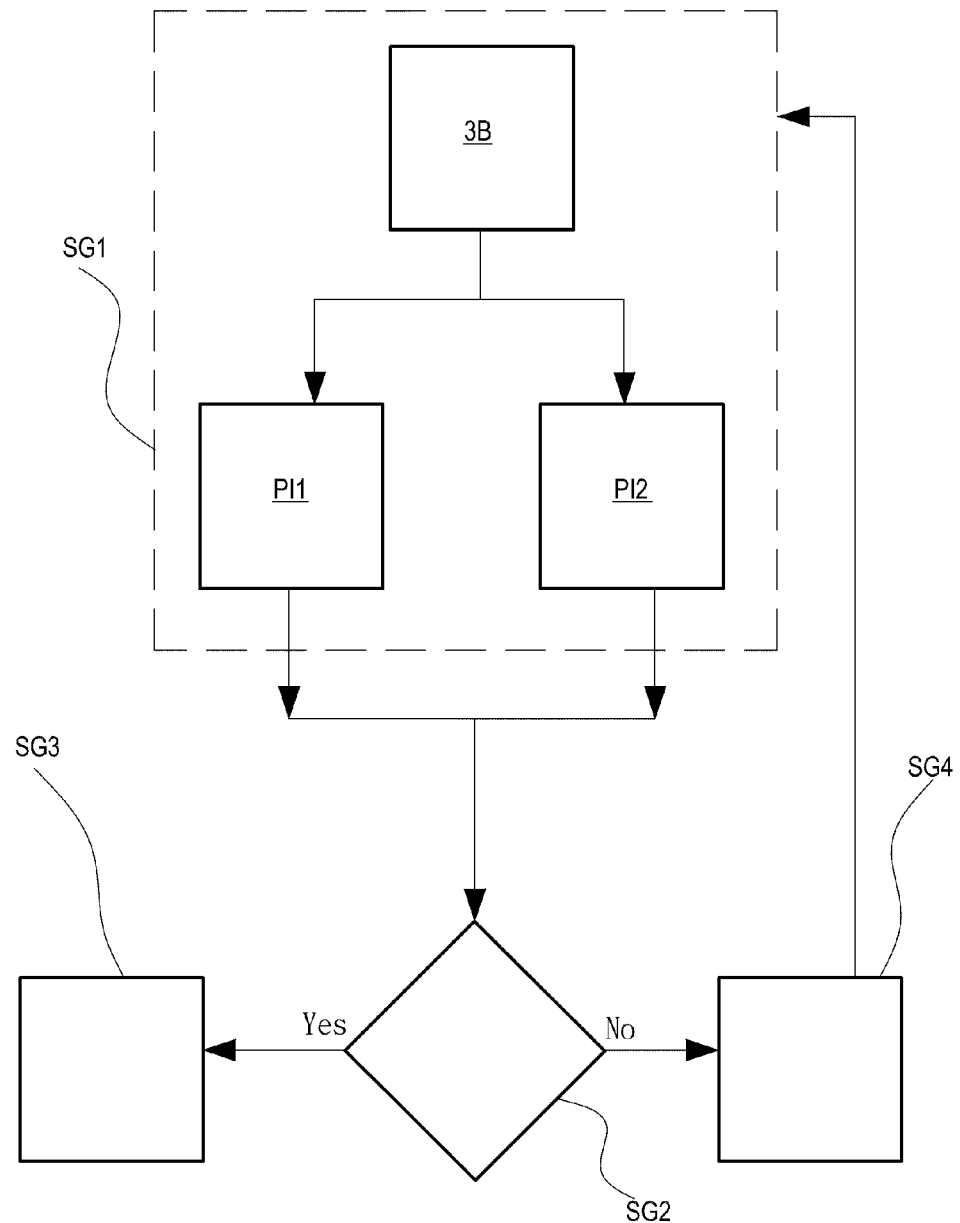
FIG. 5 is a diagram illustrating a third exemplary embodiment of the present invention.

FIG. 5 is a diagram illustrating a third embodiment. The image restoration module 3B operates individually and optimize alone. The method comprises of:

Step SG1: generating at least two restorable point spread functions of image restoration PI1, PI2 from an image restoration module 3B;

Step SG2: comparing the similarity of the point spread functions of image restoration PI1, PI2;

Step SG3: outputting at least one parameter of the image restoration module 3B when the similarity of point spread functions of image restoration PI1, PI2 is equal to or larger than the threshold value T; and Step SG4: optimizing the optical module and looping the step for generating at least two restorable point spread functions of image restoration PI1, PI2 from an image restoration module 3B (step SG1) when the similarity of point spread functions of image restoration PI1, PI2 is less than the threshold value T.

In the step for generating at least two restorable point spread functions of image restoration PI1, PI2 from an image restoration module 3B (step SG1), it can generate different point spread function of image restoration (ex. PI1,PI2) by using different noises.

Furthermore, the step for comparing the similarity of the restorable point spread functions of image restoration PI1, PI2 (step SG2) further comprises of judging the blur minimization of the point spread function of image restoration.

Fourth Embodiment

Figure 6:
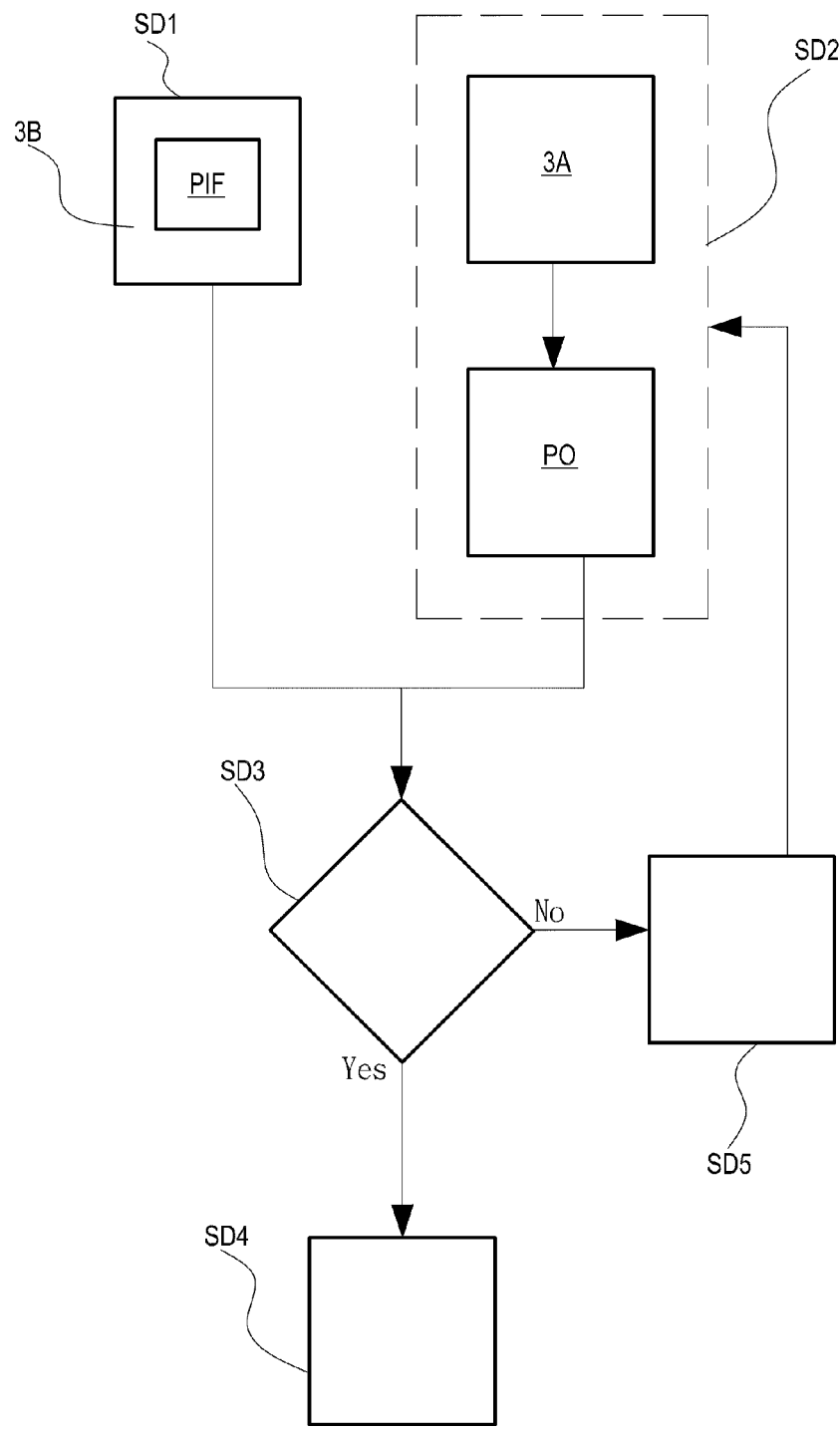
FIG. 6 is a diagram illustrating a fourth exemplary embodiment of the present invention.

FIG. 6 is a diagram illustrating a fourth embodiment. The optical module 3A operates individually and optimizes alone first, and then combines with the image restoration module 3B. The method comprises of:

Step SD1: providing a constantly restorable point spread function of image restoration PIF from the digital image restoration module 3B;

Step SD2: generating a point spread function of optics PO from the optical module 3A;

Step SD3: comparing the similarity of the point spread function of optics PO and the constantly restorable point spread function of image restoration PIF;

Step SD4: outputting at least one parameter of the optical module 3A while the similarity of the point spread function of optics PO and the constantly restorable point spread function of image restoration PIF is equal to or larger than the threshold value T; and Step SD5: optimizing the optical module 3A and looping the step for generating a point spread function of optics PO from the optical module 3A (step SD2) while the similarity of the point spread function of optics PO and the constant point spread function of image restoration PIF is less than the threshold value T.

In the step for comparing the similarity of the point spread function of optics PO and the constantly restorable point spread function of image restoration PI (step SD3), the step further comprises of judging the blur minimization of the point spread function of optics PO. In the step for outputting at least one parameter of the optical module 3A while the similarity of the point spread function of optics PO and the constantly restorable point spread function of image restoration PIF is equal to or larger than the threshold value T (step SD4), the at least one parameter of the optical module 3A is including one of or a mixture of a refractive index, a curvature, a thickness and a aspheric coefficient.

Fifth Embodiment

Figure 7:
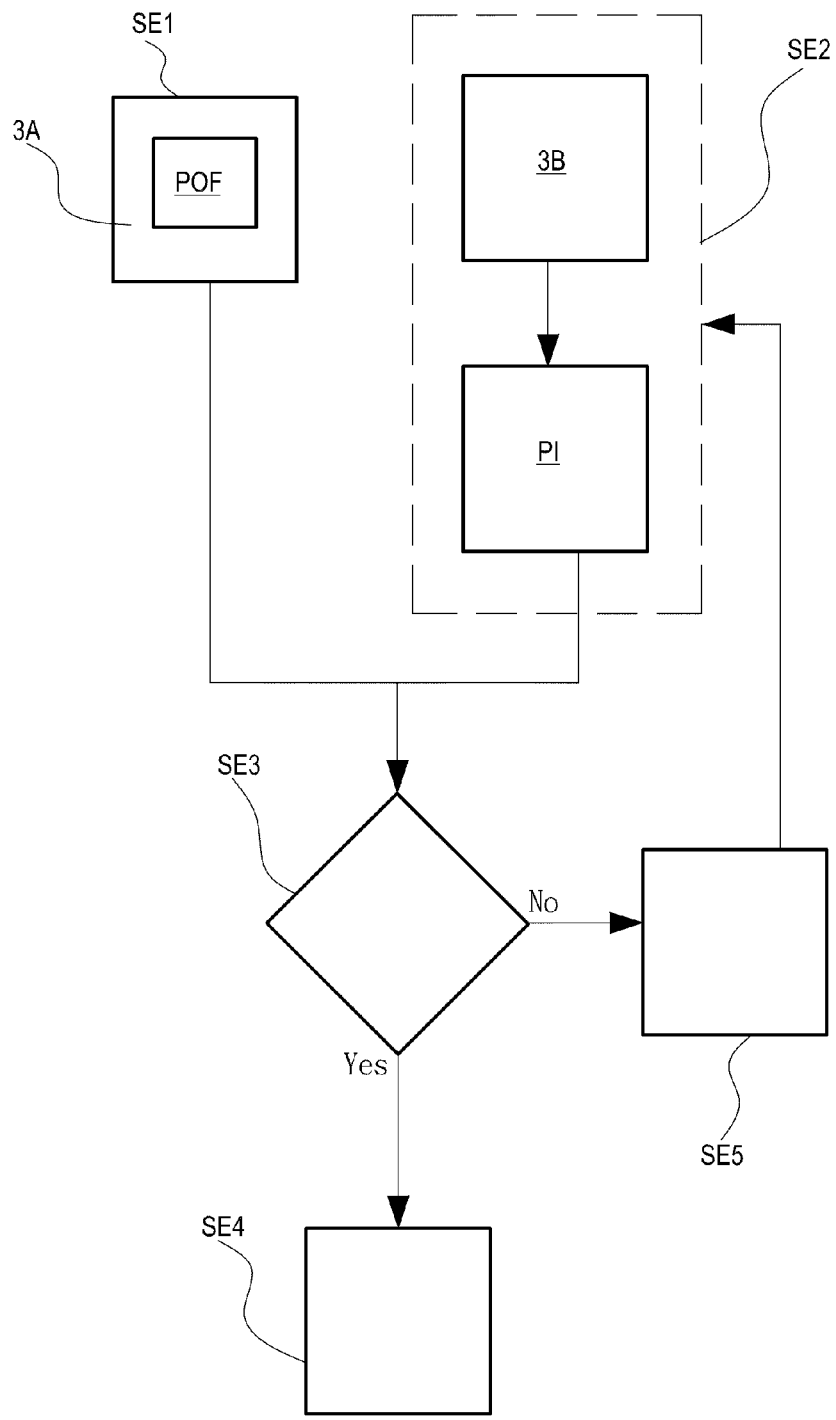
FIG. 7 is a diagram illustrating a fifth exemplary embodiment of the present invention.

FIG. 7 is a diagram illustrating a fifth embodiment. The image restoration module 3B operates individually and optimizes alone first, and then combines with the optical module 3A. The method comprises of:

Step SE1: providing a constant point spread function of optics POF from the optical module 3A;

Step SE2: generating a restorable point spread function of image restoration PI from the image restoration module 3B;

Step SE3: comparing the similarity of the constant point spread function of optics POF and the restorable point spread function of image restoration PI;

Step SE4: outputting at least one parameter of the image restoration module 3B while the similarity of the constant point spread function of optics POF and the point spread function of image restoration PI is equal to or larger than the threshold value T; and Step SE5: optimizing the image restoration module 3B and looping the step for generating a restorable point spread function of image restoration PI from the image restoration module 3B (step SE2) while the similarity of the constant point spread function of optics POF and the restorable point spread function of image restoration PI is less than the threshold value T.

In the step for comparing the similarity of the constant point spread function of optics POF and the restorable point spread function of image restoration PI (step SE3), the step further comprises of judging the blur minimization of the restorable point spread function of image restoration PI. In the step for outputting at least one parameter of the image restoration module 3B while the similarity of the constant point spread function of optics POF and the restorable point spread function of image restoration PI is equal to or larger than the threshold value T (step SE4), the at least one parameter of the image restoration module 3B is including one of or a mixture of an adjusting value, a regulation parameter and a signal to noise parameter.

Sixth Embodiment

Figure 8:
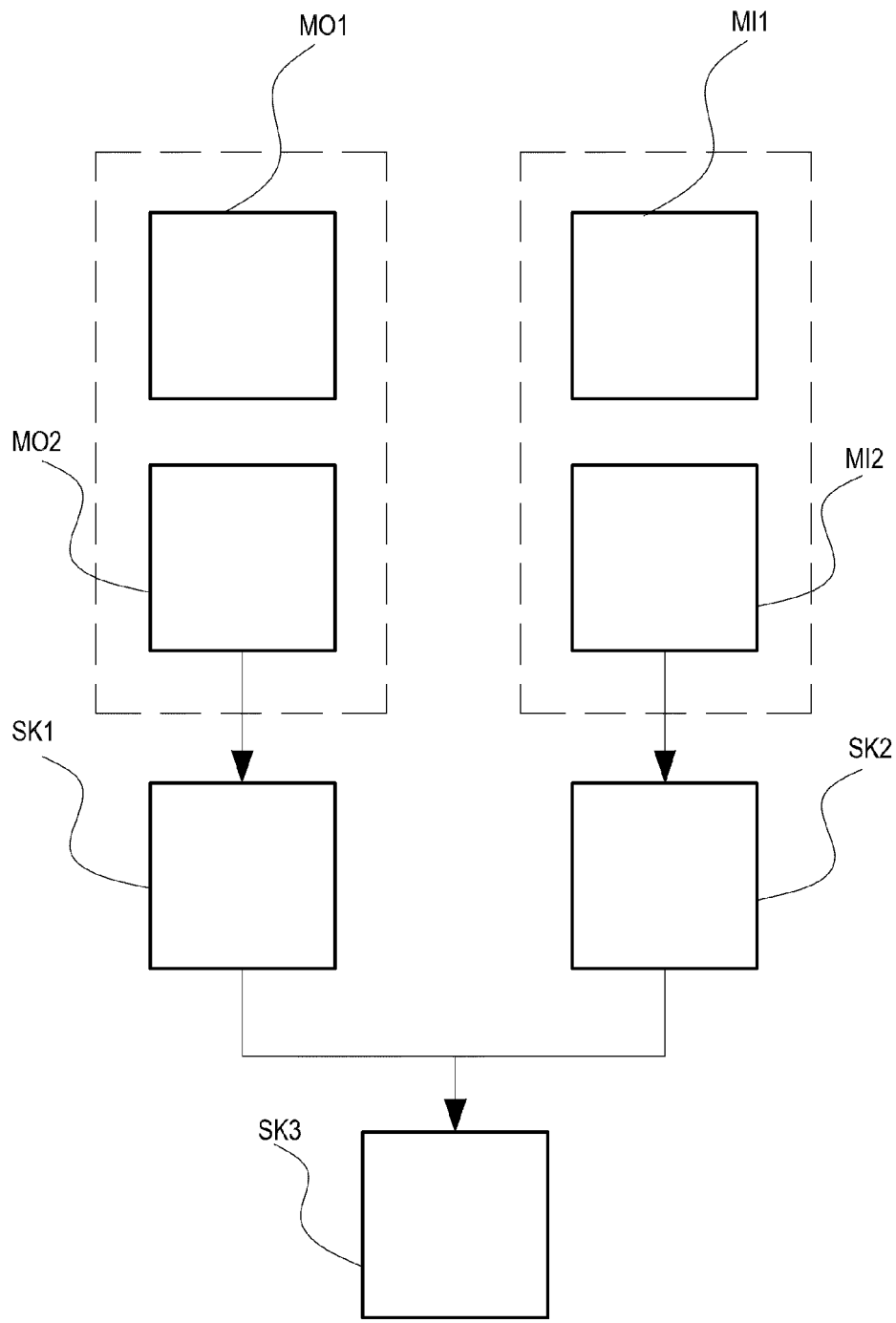
FIG. 8 is a diagram illustrating a sixth exemplary embodiment of the present invention.

FIG. 8 is a diagram illustrating a sixth embodiment. This embodiment is describing how to modularize and switch the optical module 3A and the image restoration module 3B, which are comprising of a first optical module MO1, a first image restoration module MI1, a second optical module MO2 and a second image restoration module MI2, and the method is comprising of:

Step SK1: selecting one of the modules of optics MO1 or MO2 and acquiring at least one point spread function PO of the selected optical module;

Step SK2: selecting one of the modules of image restoration MI1 or MI2 and acquiring at least one restorable point spread function PI of the selected image restoration module; and Step SK3: analyzing the similarity of the point spread function PO of the selected optical module MO1 or MO2 and the point spread function PI of the selected image restoration module MI1 or MI2, and then combining the selected optical module MO1 or MO2 and the selected image restoration module MI1 or MI2 to the system of computational optical imaging IS when the similarity is equal to or larger than the predetermined threshold value T.

In detail, the first optical module generates a first point spread function of optics, the second optical module generates a second point spread function of optics, the first image restoration module generates a first point function of image restoration and the second image restoration module generates a second point spread function of image restoration. And then, the step is to compare the similarity of the first point spread function of optics and the first point spread function of image restoration, and the similarity of the second point spread function of optics and the first point spread function of image restoration.

Therefore, while the similarity is achieving the predetermined threshold value T, it means that the optical characteristics of the first optical module and the second optical module are close the same, that is the first optical module and the second optical module are changeable so that achieving the objective of modularizing individually.

Similarly, the first optical module generates a first point spread function of optics, the second optical module generates a second point spread function of optics, the first image restoration module generates a first point function of image restoration and the second image restoration module generates a second point spread function of image restoration. And then, the step is to compare the similarity of the first point spread function of optics and the first point spread function of image restoration, and the similarity of the first point spread function of optics and the second point spread function of image restoration.

Therefore, while the similarity is achieving the predetermined threshold value T, it means that the restoration filter characteristics of the first image restoration module and the second image restoration module are close the same, that is the first image restoration module and the second image restoration module are changeable so that achieving the objective of modularizing individually.

Figure 9:
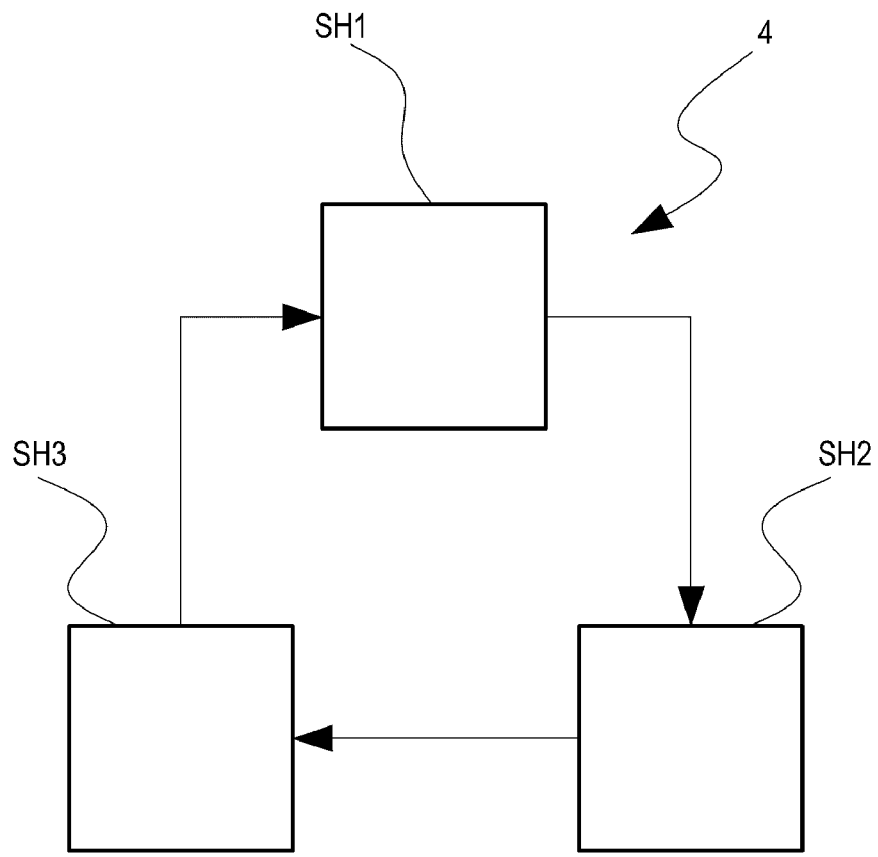
FIG. 9 is a diagram illustrating the present invention applying to a software product.

FIG. 9 is a diagram illustrating the present invention applying to a software product. A software product comprises of instructions stored on computer-readable media, wherein the instructions, when executed by a computer, performs steps for designing the system of computational optical imaging. The instructions comprise of:

SH1: instruction for modeling an optical and/or restoration system including variables definition;

SH2: instruction for evaluating a merit function from optics and/or restoration performance including point spread function similarity; and SH3: instruction for modifying the variables of the optical and/or restoration system through optimizing and looping it.

The variables definition of the optical system comprises one of or a mixture of refractive index of optical component, dimensions of optical component, thickness of optical component, wavelength, Abbe-number etc.; and the variables definition of an image restoration module comprise filter parameters, regularization parameter, signal to noise ratio parameter, and etc.

Figure 10:
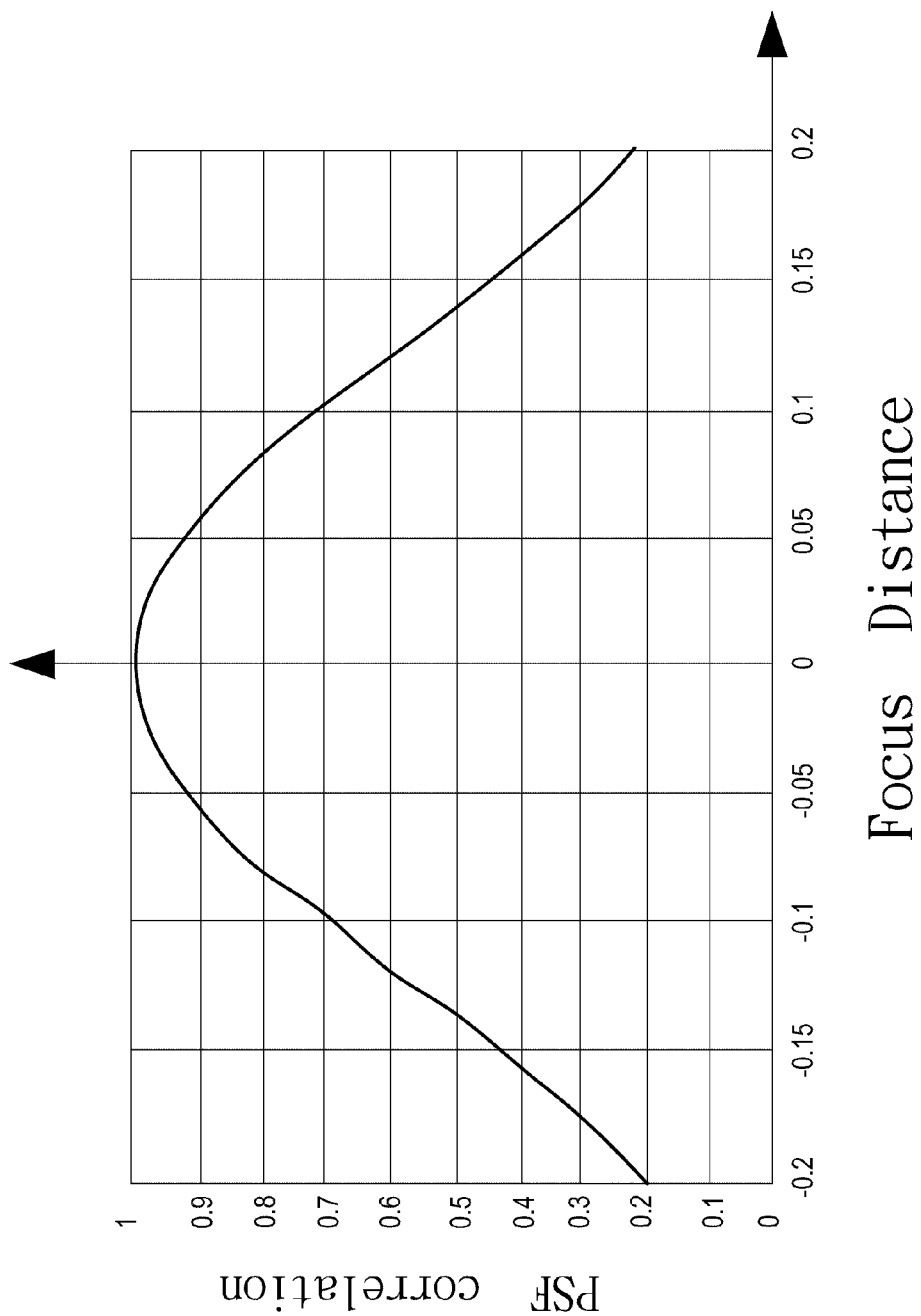
FIG. 10 is a diagram of curve of conventional optical system simulated by Doublet before optimizing.
Figure 11:
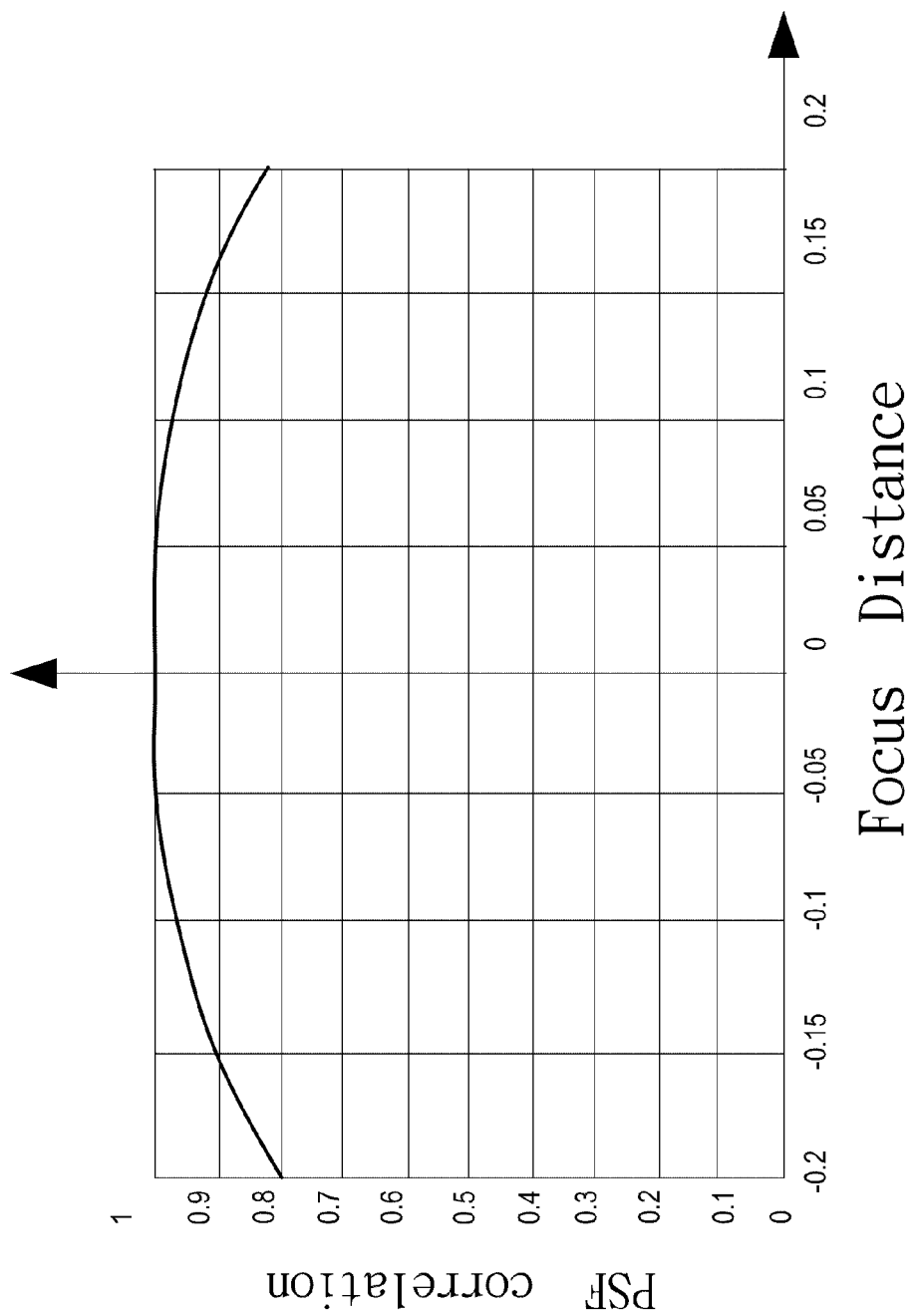
FIG. 11 is a diagram of curve of the present invention simulated by Doublet after optimizing.

FIG. 10 is a diagram of curve of conventional optical system simulated by Doublet before optimizing, FIG. 11 is a diagram of curve of the present invention simulated by Doublet after optimizing, and FIG. 12 is the parameter list of the present invention simulated by Doublet.

Taking example for the Doublet imaging system and the parameters of FIG. 12, the design object positions on the focal plane, the range of focal depth is within 0.2 mm from the front side and the rear side respectively, the value of the enter beam radius is fixed to 6.25 mm, and the value of the primary wavelength is 0.587560 mm. The variables are the aspheric coefficient at surface 1. After calculating, the similarity of the point spread function of the present invention (shown as FIG. 11) related to the conventional optical system (shown as FIG. 10) is larger than 0.8 in average.

Figure 13A:
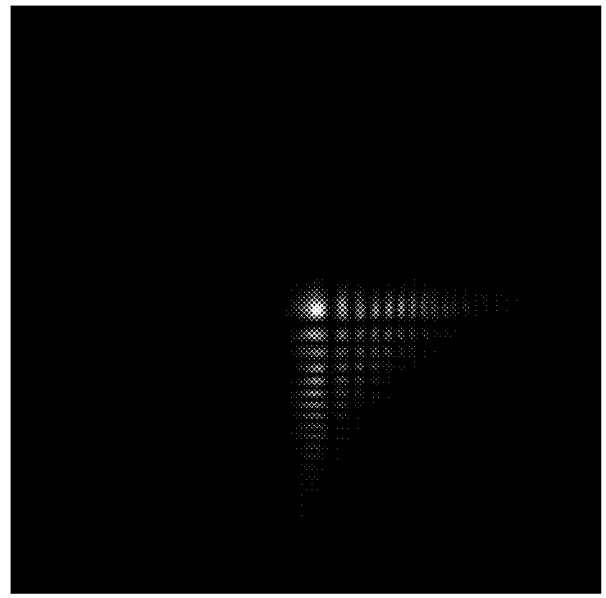
FIGS. 13A-13E are the simulation diagrams of the step SB1-SB4 of the present invention.
Figure 13B:
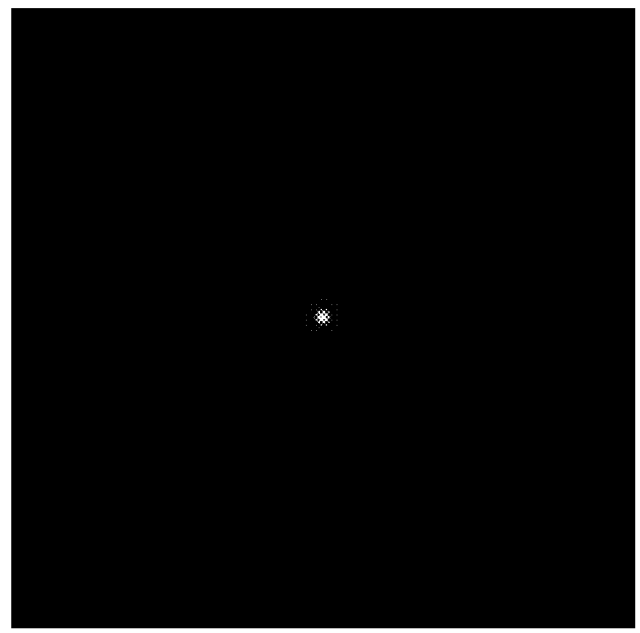
Figure 13C:
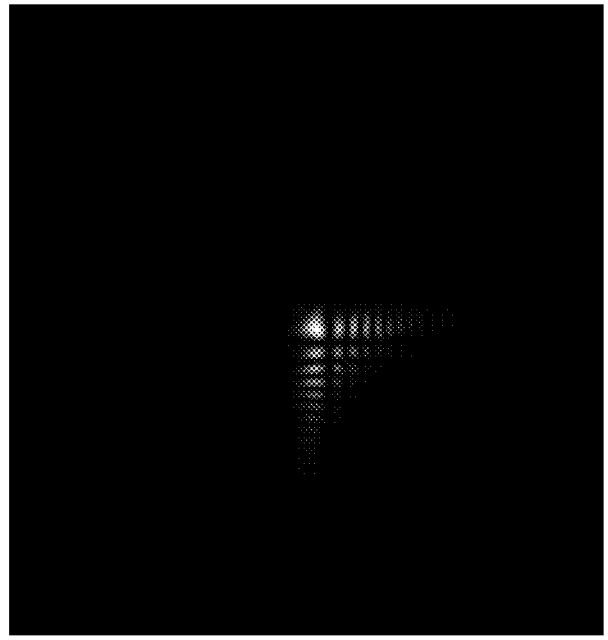
Figure 13D:
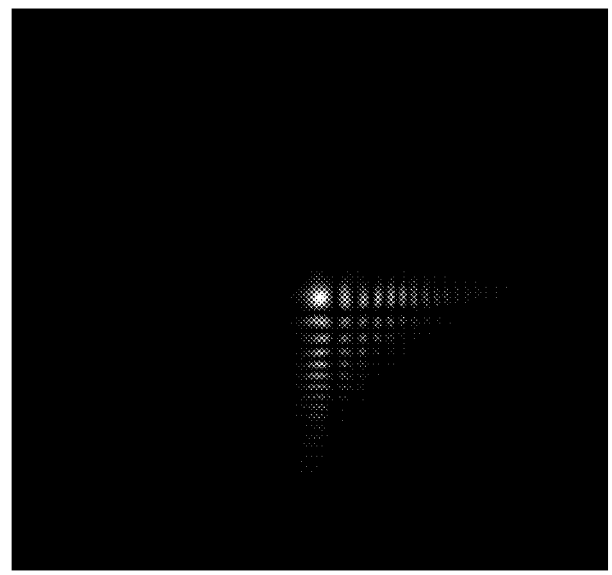
Figure 13E:
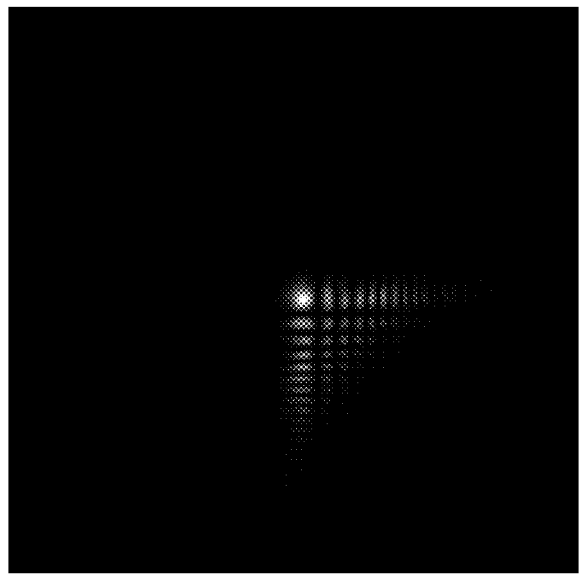
Figure 14A:
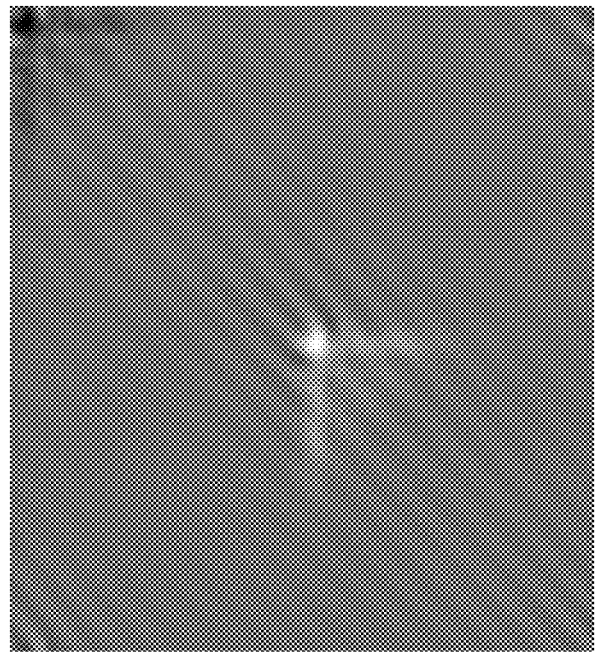
FIGS. 14A-14D are the simulation diagram of the step SC1-SC4 of the present invention.
Figure 14B:
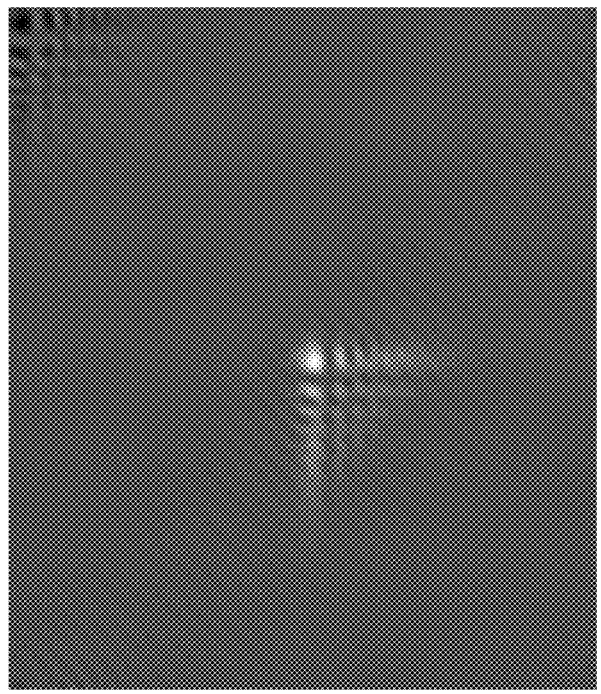
Figure 14C:
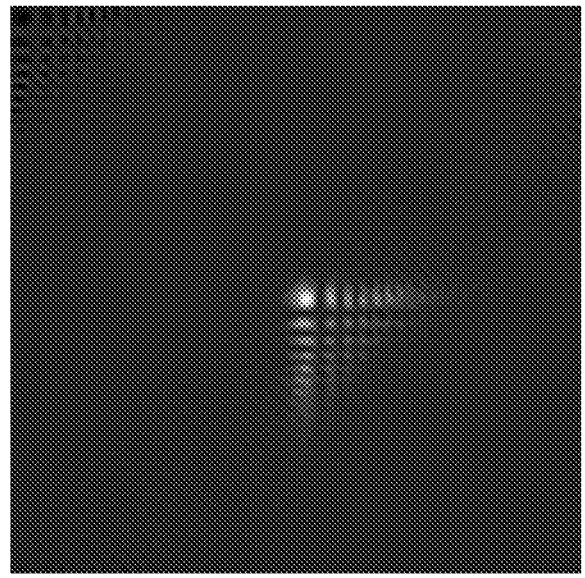
Figure 14D:
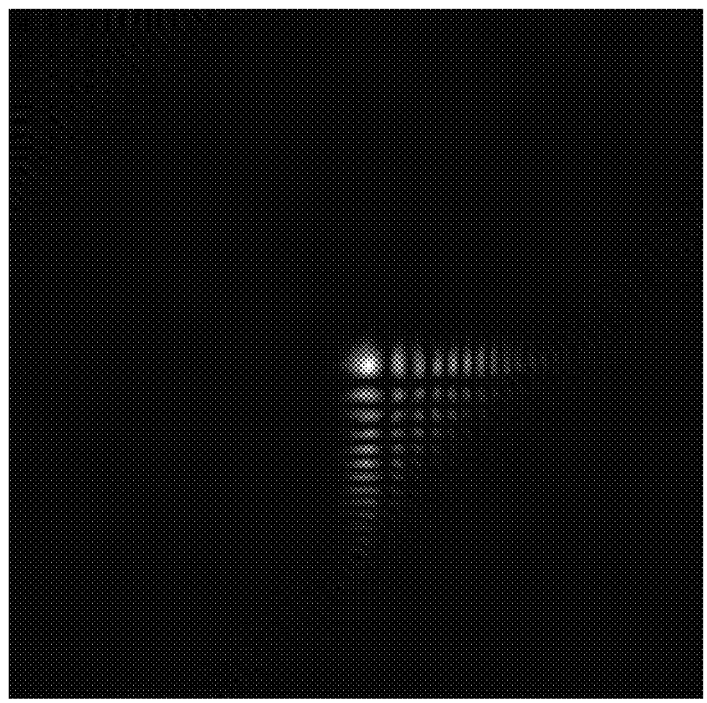

There is a simulation example for First embodiment to make much further description. For the simulation of the steps SB1-SB4, referring to FIGS. 13A-13E, the predetermined point spread function PD (shown as FIG. 13A) is predetermined and the threshold value is pre-set to 0.95. A first run point spread function of optics PO from the optical module 3A is generated (step SB1, shown as FIG. 13B). Compare the similarity of the first run point spread function of optics PO and the predetermined point spread function PD (step SB2) and then the similarity is 0.131 which is smaller than the threshold value 0.95. So, repeat step SB1 to optimize the optical module 3A (step SB4).

The second run point spread function of optics PO from the optical module 3A is generated (step SB1, shown as FIG. 13C), and compare the similarity of the second run point spread function of optics PO and the predetermined point spread function PD (step SB2) and then the similarity is 0.696 which is smaller than the threshold value 0.95. So, repeat step SB1 again to optimize the optical module 3A (step SB4).

The third run point spread functions of optics PO from the optical module 3A is generated (step SB1, shown as FIG. 13D), and compare the similarity of the third run point spread function of optics PO and the predetermined point spread function PD (step SB2) and then the similarity is 0.889 which is smaller than the threshold value 0.95. So, repeat step SB1 again to optimize the optical module 3A (step SB4).

Finally, the similarity of the fourth run point spread function of optics PO (shown as FIG. 13E) and the predetermined point spread function PD (step SB2) is 0.954 which is larger than the threshold value 0.95, and then output at least one parameter of the optical module 3A (step SB3).

Furthermore, for the simulation of the steps SC1-SC4 illustrated in FIG. 3, referring to FIGS. 14A-14D, a first run restorable point spread function of image restoration PI from the digital image restoration module 3B is generated (step SC1, shown as FIG. 14A), and compare the similarity of the first run restorable point spread function of image restoration PI and the predetermined point spread function PD (step SC2). The similarity of the first run restorable point spread function of image restoration PI and the predetermined point spread function PD is 0.549 which is smaller than the threshold value 0.95. So, repeat step SC1 to optimize the digital image restoration module 3B (step SB4).

The second run restorable point spread function of image restoration PI from the digital image restoration module 3B is generated (step SC1, shown as FIG. 14B), and compare the similarity of the second run restorable point spread function of image restoration PI and the predetermined point spread function PD (step SC2). The similarity of the second run restorable point spread function of image restoration PI and the predetermined point spread function PD is 0.812 which is smaller than the threshold value 0.95. So, repeat step SC1 again to optimize the digital image restoration module 3B (step SB4).

The third run restorable point spread function of image restoration PI from the digital image restoration module 3B is generated (step SC1, shown as FIG. 14C), and compare the similarity of the third run restorable point spread function of image restoration PI and the predetermined point spread function PD (step SC2). The similarity of the third run restorable point spread function of image restoration PI and the predetermined point spread function PD is 0.937 which is smaller than the threshold value 0.95. So, repeat step SC1 again to optimize the digital image restoration module 3B (step SB4).

Finally, the similarity of the fourth run restorable point spread function of image restoration PI (shown as FIG. 14D) and the predetermined point spread function PD is 0.995 which is larger than the threshold value 0.95, and then output at least one parameter of the digital image restoration module 3B (step SC3).

Therefore, by using above mentioned system and method, it can be achieved to modularize the system of computational optical imaging, which is to divide to an optical module and an image restoration module, and gather an objective standard by comparing the similarity and the blur minimization of the point spread functions. The optical module and/or the image restoration module are able to optimize individually so that reducing the calculation time, and are changeable while the optical characteristics of the optical module and/or the image restoration module are almost the same so as not to change whole system but save the repairing costs.

The disclosure of the embodiment is intended to illustrate the present invention, but not to limit the present invention, so the variation of cited values or replacement of equivalent elements still falls within the scope of the present invention.

Through the above detailed descriptions, it is apparent to those skilled in the art that the present invention can surely achieve the above objectives, which conforms to the provisions of the patent law, so as to apply for a patent application.

What is claimed is:

1. A method for designing computational optical imaging system, comprising the steps of:
    a step for setting a target to provide a predetermined point spread function and a threshold value;
    a step for designing an optical module, including generating a point spread function of optics from an optical module, comparing the similarity of the point spread function of optics and the predetermined point spread function, outputting at least one parameter of the optical module while the similarity of the point spread function of optics and the predetermined point spread function is equal to or larger than the threshold value; and optimizing the optical module and looping the step for generating a point spread function of optics from the optical module while the similarity of the point spread function of optics and the predetermined point spread function is less than the threshold value; and
    a step for designing an image restoration module;
    wherein the step for designing an optical module and the step for designing an image restoration module operate individually synchronously or in sequence.

2. The method for designing computational optical imaging system according to claim 1, wherein the step for comparing the similarity of the point spread function of optics and the predetermined point spread function comprises comparing a blur minimization of the point spread function of optics and the predetermined point spread function.

3. The method for designing computational optical imaging system according to claim 1, wherein the at least one parameter of the optical module is including one of or a mixture of a refractive index, a curvature, a thickness and a aspheric coefficient.

4. A method for designing computational optical imaging system, comprising the steps of:
    a step for setting a target to provide a predetermined point spread function and a threshold value;
    a step for designing an optical module;
    a step for designing an image restoration module, including generating a restorable point spread function of image restoration from a digital image restoration module, comparing the similarity of the restorable point spread function of image restoration and the predetermined point spread function, outputting at least one parameter of the digital image restoration module while the similarity of the restorable point spread function of image restoration and the predetermined point spread function is equal to or larger than the threshold value; and optimizing the digital image restoration module and looping the step for comparing the similarity of the restorable point spread function of image restoration and the predetermined point spread function while the similarity of the restorable point spread function of image restoration and the predetermined point spread function is less than the threshold value;

wherein the step for designing an optical module and the step for designing an image restoration module operate individually synchronously or in sequence.

5. The method for designing computational optical imaging system according to claim 4, wherein comparing the similarity of the restorable point spread function of image restoration and the predetermined point spread function comprises judging a blur minimization of the point spread function of image restoration and the predetermined point spread function.

6. The method for designing computational optical imaging system according to claim 4, wherein the at least one parameter of the digital image restoration module is one of a mixture of an adjusting value, a regulation parameter and a signal to noise parameter.

7. A method for designing computational optical imaging system, comprising the steps of:
providing a constantly restorable point spread function of image restoration from a digital image restoration module;
generating a point spread function of optics from an optical module;
comparing the similarity of the point spread function of optics and the constantly restorable point spread function of image restoration;
outputting at least one parameter of the optical module while the similarity of the point spread function of optics and the constantly restorable point spread function of image restoration is equal or larger than a threshold value; and
optimizing the optical module and looping the step for generating a point spread function of optics from an optical module while the similarity of the point spread function of optics and the constantly restorable point spread function of image restoration is less than the threshold value.

8. The method for designing computational optical imaging system according to claim 7, wherein comparing the similarity of the point spread function of optics and the constantly restorable point spread function of image restoration further comprises judging a blur minimization of the point spread function of optics and the constantly restorable point spread function of image restoration.

9. The method for designing computational optical imaging system according to claim 7, wherein the at least one parameter of the optical module is including one of or a mixture of a refractive index, a curvature, a thickness and a aspheric coefficient.

10. A method for designing computational optical imaging system, comprising the steps of:
providing a constant point spread function of optics from an optical module;
generating a restorable point spread function of image restoration from a digital image restoration module;
comparing the similarity of the constant point spread function of optics and the restorable point spread function of image restoration;
outputting at least one parameter of the digital image restoration module while the similarity of the constant point spread function of optics and the restorable point spread function of image restoration is equal or larger than a threshold value; and
optimizing the digital image restoration module and looping the step for generating a restorable point spread function of image restoration from a digital image restoration module while the similarity of the constant point spread function of optics and the restorable point spread function of image restoration is less than the threshold value.

11. The method for designing computational optical imaging system according to claim 10, wherein judging the similarity of the constant point spread function of optics and the restorable point spread function of image restoration is by comparing a blur minimization of the constant point spread function of optics and the restorable point spread function of image restoration.

12. The method for designing computational optical imaging system according to claim 10, wherein the at least one parameter of the image restoration module is an adjusting value.

13. A combination method of a system of computational optical imaging system, the system having modules of optics and modules of image restoration, the combination method is comprising:
selecting one of the modules of optics and acquiring at least one point spread function of the selected optical module;
selecting one of the modules of image restoration and acquiring at least one restorable point spread function of the selected image restoration module; and
analyzing the similarity of the point spread function of the selected optical module and the selected image restoration module individually or in sequence, and then combining the selected optical module and the selected image restoration module to the system of computational optical imaging when the similarity is equal to or larger than a predetermined threshold value.

14. The combination method according to claim 13, further comprising acquiring at least one blur minimization of point spread function of selected optical module and selected image restoration module, and then combining the selected optical module and the selected image restoration module to the system of computational optical imaging when the blur minimization is equal to or larger than a predetermined threshold value.

15. A method for designing computational optical imaging system, comprising the steps of:
generating at least two point spread functions of optics from an optical module;
comparing the similarity of the point spread functions of optics;
outputting at least one parameter of the optical module when the similarity of point spread functions of optics is equal to or larger than a threshold value; and
optimizing the optical module and looping the step for generating at least two point spread functions of optics from an optical module when the similarity of point spread functions of optics is less than the threshold value.

16. The method for designing computational optical imaging system according to claim 15, wherein judging the similarity of the point spread functions of optics is by comparing a blur minimization of point spread functions of optics.

17. The method for designing computational optical imaging system according to claim 15, wherein the at least one parameter of the optical module is including one of or a mixture of a refractive index, a curvature, a thickness and a aspheric coefficient.

18. A method for designing computational optical imaging system, comprising the steps of:
generating at least two restorable point spread functions of image restoration from an image restoration module;

comparing the similarity of the point spread functions of image restoration;

outputting at least one parameter of the image restoration module when the similarity of point spread functions of image restoration is equal to or larger than a threshold value; and optimizing the optical module and looping the step for generating at least two restorable point spread functions of image restoration from an image restoration module when the similarity of point spread functions of image restoration is less than the threshold value.

19. The method for designing computational optical imaging system according to claim 18, wherein judging the similarity of the restorable point spread functions of image restoration is by comparing a blur minimization of point spread functions of image restoration.

20. The method for designing computational optical imaging system according to claim 18, wherein the at least one parameter of the digital image restoration module is an adjusting value.

21. A software product comprising instructions stored on a non-transitory computer-readable media, wherein the instructions, when executed by a computer, performs steps for designing the system of computational optical imaging, the instructions comprising:

instruction for setting a target to provide a predetermined point spread function and a threshold value;

instruction for designing an optical module, including generating a point spread function of optics from an optical module, comparing the similarity of the point spread function of optics and the predetermined point spread function, outputting at least one parameter of the optical module while the similarity of the point spread function of optics and the predetermined point spread function is equal to or larger than the threshold value; and optimizing the optical module and looping the step for generating a point spread function of optics from an optical module while the similarity of the point spread function of optics and the predetermined point spread function is less than the threshold value; and instruction for designing an image restoration module;

wherein the step for designing an optical module and the step for designing an image restoration module operate individually synchronously or in sequence.

* * * * *